J. WHITTEMORE.
METHOD AND APPARATUS FOR MAKING CONTINUOUS SHEET GLASS.
APPLICATION FILED NOV. 26, 1920.

1,436,421.

Patented Nov. 21, 1922.

INVENTOR
James Whittemore
BY C.A. Rowley
ATTORNEY

Patented Nov. 21, 1922.

1,436,421

UNITED STATES PATENT OFFICE.

JAMES WHITTEMORE, OF DETROIT, MICHIGAN, ASSIGNOR TO THE LIBBEY-OWENS SHEET GLASS COMPANY, OF TOLEDO, OHIO, A CORPORATION OF OHIO.

METHOD AND APPARATUS FOR MAKING CONTINUOUS SHEET GLASS.

Application filed November 26, 1920. Serial No. 426,378.

*To all whom it may concern:*

Be it known that I, JAMES WHITTEMORE, a citizen of the United States, residing at Detroit, in the county of Wayne and State of Michigan, have invented new and useful Improvements in Methods and Apparatus for Making Continuous Sheet Glass, of which the following is a specification.

This invention relates to a new and improved method and apparatus for producing a continuous sheet of glass. In methods heretofore used, considerable difficulty has been encountered in transferring the glass from the molten bath into the sheet without marring and streaking the same through contact with foreign objects, particularly when the sheet is drawn off horizontally. If the sheet is drawn off directly from a lip or slot, it is necessary to cool the glass fed into the sheet to such an extent that devitrification occurs on the surface from which the sheet is drawn, causing lines and striations in the sheet. On the other hand if the glass is maintained in a sufficiently molten condition to flow freely from the source of supply, it is difficult to control the flowing glass and carry it off in sheet form. In practicing the present invention the glass is maintained in a sufficiently hot and molten condition to flow freely from the source of supply without danger of devitrification at the flowing point, and this flow of molten glass is then caught and suspended on a constantly rotating cylinder of refractory material, the glass sheet being then drawn from the mass of cooler glass carried on the surface of the cylinder without being marred by contact with any forming surfaces.

The invention will be more clearly understood from the following description and illustration of certain forms of apparatus adapted to carry the invention into practice.

Figure 1:
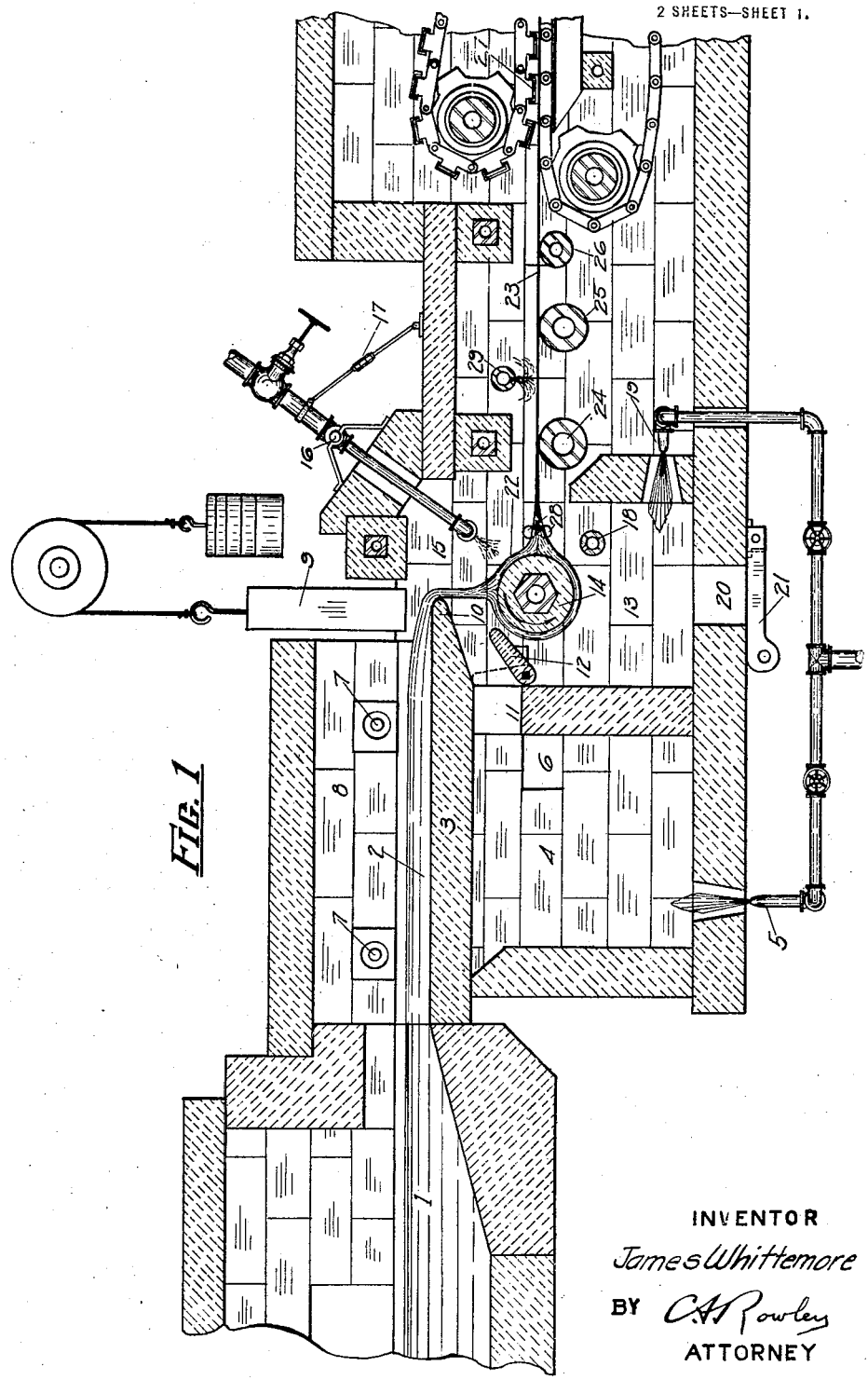
Fig. 1 is a longitudinal vertical section through one form of mechanism wherein the sheet is drawn off horizontally.

Referring first to the device shown in Fig. 1, the delivery end of a continuous tank furnace for supplying molten glass is indicated at 1. From this tank the glass flows in a continuous shallow stream 2, over a slab 3, beneath which is arranged a heating chamber 4, heated by burners 5. Draft for the burners is provided through the flues shown at 6. The glass stream 2 may be heated from above by the burners 7, in enclosing chamber 8, and the flow of glass from slab 3 may be cut off when desired by shear-cake 9, vertically adjustable at the end of the slab 3. The molten glass will normally flow freely in a continuous shallow stream over the lip 10 at the end of slab 3. A port 11, regulated by valve 12 is provided at the upper end of chamber 4, whereby if necessary, heat from chamber 4 may be directed against the under side of lip 10 and the stream of flowing glass, to prevent undue cooling at this point and the formation of "dog-metal" or devitrified glass.

Below the lip 10, in the substantially enclosed heated chamber 13, is mounted a rotatable cylindrical roller 14 of suitable refractory material, such as fire-clay. This roller 14 is carried by a water-cooled shaft, and is constantly driven preferably in the direction of the arow, by any suitable driving means located outside of the chamber 13. The glass flowing onto this roller 14 forms a cylindrical layer of viscous glass thereon, whose temperature is regulated by means of the heat from port 11; the adjustable burners 15; and the combination burners or air-coolers 18. Burner 15, comprises a horizontal row of flames playing across the face of the roller, the support for the burner being pivoted at 16, and adjustable by turnbuckle 17, so that the heat may be applied at the desired point on the roller. The perforated cross-pipe 18 may be supplied either with gas to provide an additional burner below the roller, or compressed air may be supplied to provide cooling jets against the lower face of the glass. The chamber 13 is heated by burners 19. Below the roller 14, an opening 20 having a closure 21 is provided in chamber 13, through which excess glass which may drop from the roller may be removed.

The cylindrical layer of viscous glass 22, carried by roller 14, furnishes the source from which the glass sheet 23 is continuously drawn off in a horizontal plane. The sheet 23 is supported by suitable rollers 24, 25 and 26, and the drawing traction is furnished by any suitable form of drawing mechanism indicated at 27, which preferably grips the sheet at the edge portions only. Suitable edge forming and width maintaining rollers 28, such as shown in the patent to Colburn 1,248,809, granted Dec. 4, 1917, are preferably used adjacent the ends of the roller 14, at the sheet-drawing point. A reheating burner 29, located above the drawn sheet 23, keeps the sheet at such a temperature that it may be flattened out when it passes into the drawing mechanism 27.

In operation, when there is a supply of molten glass in tank 1 in the proper condition, the roller 14 is started in rotation counter-clockwise, in the direction of the arrow, and the shear-cake 9 is raised to permit a thin stream of hot molten glass to flow down onto the rotating cylinder. This glass will, for the most part, adhere to the cylinder and form a gradually thickening layer of somewhat cooler and more viscous glass, which eventually will tend to drop off at the lower side of the cylinder. A heated bait is then inserted in this downward flow of glass and pulled around into the horizontal plane and the sheet passed off through the drawing mechanism. The supply of glass on the cylinder is constantly replenished by the stream flowing from the molten source 2. The apparatus may be successfully operated if the cylinder is rotated in a clockwise direction, but the glass supply on the cylinder may be more easily maintained at the proper temperature for drawing if the cylinder is rotated counter-clockwise as shown.

Figure 2:
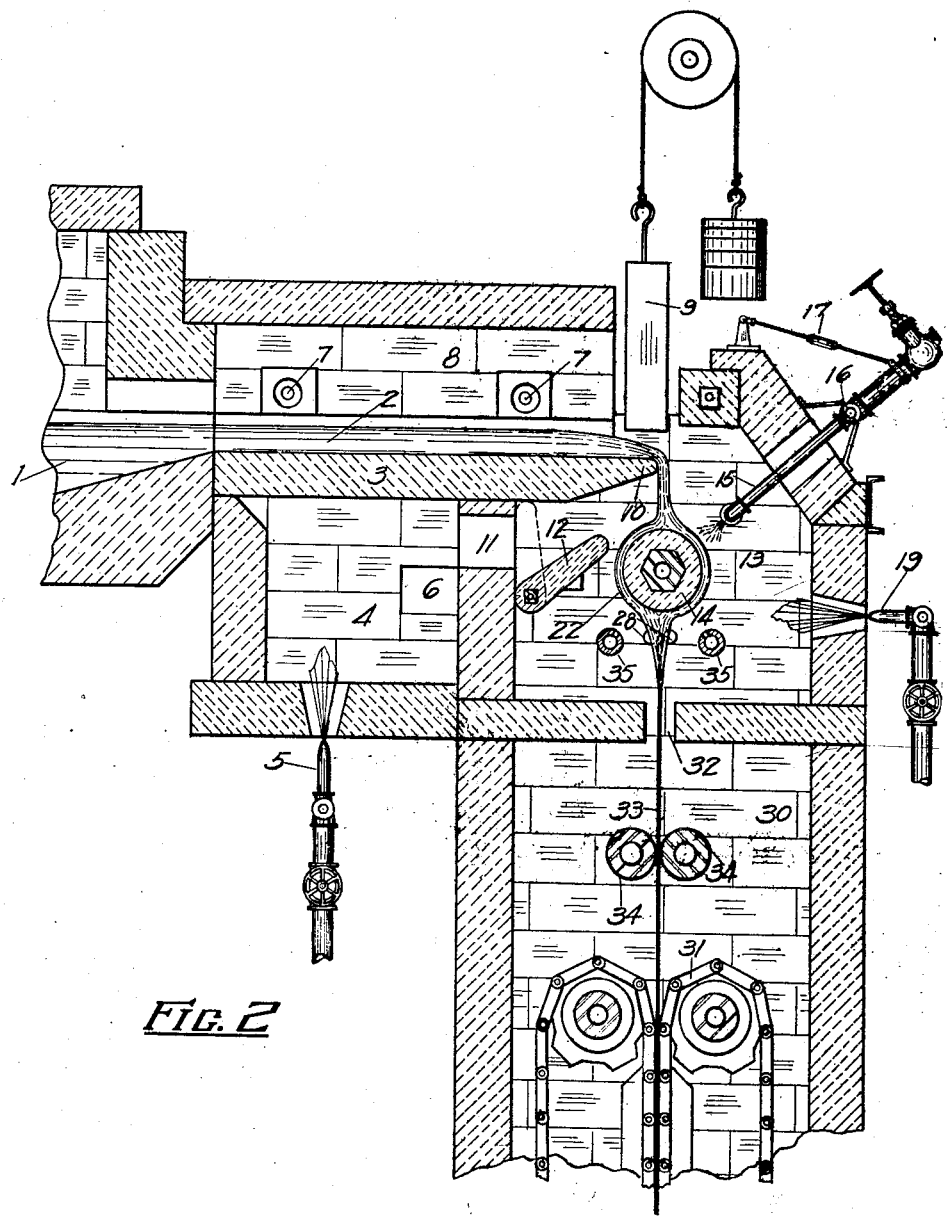
Fig. 2 is a similar view of an apparatus wherein the sheet is drawn vertically downward.

The form of apparatus shown in Fig. 2 is, in most respects substantially identical with that already described. Parts indicated by the same reference characters are the same, and function the same as in the form shown in Fig. 1. In this second type of apparatus, a closed chamber 30, containing any approved sheet drawing mechanism 31, is located beneath the chamber 13, there being a narrow connecting passage 32, through which the sheet 33 is pulled vertically downward from the cylinder 14. A pair of guide rollers 34 are located at each side of the sheet with a slight clearance at a point above the drawing mechanism. These rollers engage the sheet loosely and merely serve as guides for the sheet. In the chamber 13, at each side of the sheet below roller 14, is a combination burner or air-cooler 35, similar to the one shown at 18 in Fig. 1.

It is to be understood that in either form of the invention the sheet is passed directly into an annealing leer after emerging from the drawing mechanism.

Claims:

1. The method of drawing sheet glass, which consists in flowing a stream of molten glass from above onto a rotating cylindrical member, to which it adheres as a cylindrical layer of glass and then drawing the glass sheet from the layer of glass carried by the surface of the rotating member.

2. The method of forming sheet glass, which consists in flowing a stream of molten glass from above onto a constantly rotating cylindrical member, and then drawing the glass sheet radially from the mass of glass adhering to the surface of the rotating member.

3. The method of drawing sheet glass, which consists in flowing a stream of molten glass from above onto a constantly rotating cylindrical member, and then drawing the glass sheet horizontally from the mass of glass carried by the surface of the rotating member.

4. The method of drawing sheet glass which consists in maintaining a layer of molten glass on the surface of a constantly rotating cylindrical member by continuously flowing a stream of molten glass from above onto the member, and then drawing a sheet of glass from the rotating glass cylinder in a plane passing through the axis of the rotating member.

5. The method of drawing sheet glass, which consists in maintaining a cylinder of molten glass on the surface of a constantly rotating cylindrical member by continuously flowing a stream of molten glass from above onto the member, and then drawing a sheet of glass from the rotating glass cylinder, in a horizontal plane passing through the axis of the rotating member.

6. In an apparatus for making continuous sheet glass, a rotating cylindrical member adapted to carry on its cylindrical surface a continuous layer of molten glass, means for drawing a sheet of glass therefrom, and means for flowing a stream of molten glass from above onto the rotating member to replenish the supply.

7. In an apparatus for making continuous sheet glass, a rotating cylindrical member of refractory material for carrying on its surface a layer of hot viscous glass, means for drawing a sheet of glass radially from this rotating mass of glass, and means for flowing a stream of molten glass from above onto the cylindrical member to replenish the surface layer.

8. In an apparatus for making continuous sheet glass, a rotating cylindrical member of refractory material for carrying on its cylindrical surface a continuous layer of hot viscous glass, means for controlling the temperature of the glass on the cylinder, means for continuously drawing a sheet of glass from this viscous layer, and means for flowing glass from above onto the cylindrical member to replenish the supply drawn off in sheet form.

9. In an apparatus for making continuous sheet glass, a source of molten glass, means for flowing the molten glass from the source, means for regulating the temperature of the flowing glass, a rotating cylindrical member below the source which catches and carries the flowing glass as a continuous cylindrical layer, and means for drawing a glass sheet from the glass carried by the cylindrical member.

10. In an apparatus for making continuous sheet glass, a source of molten glass, a discharge outlet for flowing the molten glass from the source, means for regulating the temperature of the flowing glass, a rotating cylindrical member below the source onto which the glass flows, means for regulating the temperature of the continuous layer of glass carried on the cylindrical surface of the rotating member, sheet drawing mechanism, for pulling a sheet of glass from the glass carried by the rotating member, and means for maintaining the width of the drawn sheet.

Signed at Toledo, in the county of Lucas and State of Ohio, this 23d day of Nov., 1920.

JAMES WHITTEMORE.